United States Patent
Koga

(10) Patent No.: US 8,102,641 B2
(45) Date of Patent: Jan. 24, 2012

(54) CERAMIC ELECTRONIC COMPONENT AND METHOD FOR MANUFACTURING THE SAME

(75) Inventor: Seiji Koga, Yasu (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 360 days.

(21) Appl. No.: 12/558,723

(22) Filed: Sep. 14, 2009

(65) Prior Publication Data

US 2010/0067170 A1    Mar. 18, 2010

(30) Foreign Application Priority Data

Sep. 17, 2008    (JP) ................................. 2008-237660

(51) Int. Cl.
*H01G 4/228*    (2006.01)
(52) U.S. Cl. ...................... 361/306.3; 361/309; 29/25.42
(58) Field of Classification Search ............... 361/306.1, 361/306.3, 308.1, 309; 29/25.42
See application file for complete search history.

(56) References Cited

U.S. PATENT DOCUMENTS

| | | | | |
|---|---|---|---|---|
| 5,426,560 A | * | 6/1995 | Amaya et al. | 361/309 |
| 6,344,963 B1 | * | 2/2002 | Mori | 361/306.3 |
| 6,388,864 B1 | * | 5/2002 | Nakagawa et al. | 361/309 |
| 7,808,770 B2 | * | 10/2010 | Itamura et al. | 361/309 |
| 2002/0027764 A1 | * | 3/2002 | Kishimoto et al. | 361/321.2 |
| 2003/0099084 A1 | * | 5/2003 | Duva | 361/306.3 |

FOREIGN PATENT DOCUMENTS

| | | |
|---|---|---|
| GB | 2 354 112 A | 3/2001 |
| JP | 10-284343 A | 10/1998 |
| JP | 2001-076957 A | 3/2001 |

OTHER PUBLICATIONS

Official Communication issued in corresponding European Patent Application No. 09011235.0, mailed on Dec. 8, 2009.

\* cited by examiner

*Primary Examiner* — Eric Thomas
(74) *Attorney, Agent, or Firm* — Keating & Bennett, LLP

(57) ABSTRACT

A ceramic electronic component that is hardly influenced by a stress generated when an external electrode containing a metal sintered compact is formed at the end of the ceramic component body, and a method for manufacturing the same are provided. A laminated ceramic capacitor includes a ceramic component body and first electrodes to be connected to internal electrodes that are led to the end surfaces are formed. The first external electrodes are arranged so that the ends are spaced apart from the side surfaces of the ceramic component body. Second external electrodes containing a conductive resin are arranged so as to entirely cover the first electrodes and first and second metal layers and are formed thereon. The first external electrodes are formed by supplying a conductive paste containing conductive metal powder and glass frit having a softening point higher than the sintering starting temperature of the conductive metal powder, and heating the same.

5 Claims, 9 Drawing Sheets

– 1 –
CERAMIC ELECTRONIC COMPONENT AND METHOD FOR MANUFACTURING THE SAME

BACKGROUND OF THE INVENTION

1. Field of the Invention

The present invention relates to a ceramic electronic component and a method for manufacturing the same. In particular, the present invention relates to a ceramic electronic component, such as a laminated ceramic capacitor, in which a terminal electrode is formed at the end surface of a ceramic component body and a method for manufacturing the same.

2. Description of the Related Art

FIG. 9 is a diagram illustrating an example of a conventional ceramic electronic component. A ceramic electronic component 1 contains a ceramic electronic component body 2. The ceramic electronic component body 2 contains layers of internal electrodes 3 and ceramic layers 4. The internal electrodes 3 are led to two end surfaces of the ceramic electronic component body 2. A metal layer 5 is formed in such a manner as to be connected to the internal electrodes 3. The metal layer 5 is formed by printing a conductive paste containing metal powder to the end surface of the ceramic electronic component body 2. The metal layer 5 is formed in such a manner as to wrap around from the end surface of the ceramic component body 2 to a part of the side surface. On the metal layer 5, a conductive resin layer 6 is further formed. The conductive resin layer 6 is formed by supplying a mixture of metal powder and a thermosetting resin, such as an epoxy resin, to the metal layer 5, and heat curing the same. The conductive resin layer 6 is formed in such a manner as to entirely cover the metal layer 5. On the conductive resin layer 6, a plating film 7 containing a lower film containing Ni or the like and a surface film containing Sn or the like is formed.

In the ceramic electronic component having the metal layer formed at the end surface of the ceramic electronic component body, a large stress is applied to the metal layer due to a thermal shock cycle in which increases and decreases in temperatures are repeated, sometimes resulting in development of cracks in the ceramic component body. Since such a stress is concentrated on the end of the metal layer at the side surface of the ceramic component body, cracks are likely to develop at the portion in the ceramic component body. When the ceramic electronic component is attached to a wiring board, such a stress increases due to the thermal shock cycle by the difference in the coefficient of thermal expansion between the ceramic electronic component and the wiring board. Thus, cracks are likely to develop in the ceramic component body.

It is described that, in order to avoid the above problems, the development of cracks in the ceramic component body can be prevented by covering the metal layer 5 with the conductive resin layer 6 to thereby reduce the stress generated in the metal layer 5 (see Japanese Unexamined Patent Application Publication No. 2001-76957).

It is also described that the development of cracks in the ceramic component body 2 due to thermal strain of the metal layer 5 or the development of cracks in the ceramic electronic component attached to the wiring board due to bending of the wiring board can be prevented when the ratio between the wrapping length of the metal layer 5 at the side surface of the ceramic component body 2 and the wrapping length of the conductive resin layer 6 is adjusted to a given ratio (see Japanese Unexamined Patent Application Publication No. 10-284343).

In such a ceramic electronic component, a stress caused by metal sintering shrinkage is concentrated on the end of the metal layer at the side surface of the ceramic electronic component body when a conductive paste is supplied and printed to the end surface of the ceramic electronic component body. Such a stress cannot be reduced even when the metal layer is covered with the conductive resin layer. When the wiring board to which the ceramic electronic component is attached bends to apply a stress caused by the bending of the wiring board, cracks are likely to develop at the end of the metal layer in the ceramic component body. Such cracks reach the internal electrodes, the properties of the ceramic electronic component are affected. For example, in the case of a laminated ceramic capacitor, the electric capacity decreases.

SUMMARY OF THE INVENTION

In view of the above, preferred embodiments of the present invention provide a ceramic electronic component that is hardly influenced by the stress generated when an external electrode containing a metal sintered compact is formed at the end of the ceramic component body, and a method for manufacturing the same.

According to preferred embodiments of the present invention, a ceramic electronic component includes a ceramic component body having two end surfaces to which internal electrodes are led and side surfaces connecting the two end surfaces; first external electrodes containing a metal sintered compact and arranged to wrap around from the two end surfaces of the ceramic component body to a portion of the side surfaces to be connected to the internal electrodes; and second external electrodes containing a conductive resin and arranged so as to entirely cover the first external electrodes at the side surfaces of the ceramic component body; in which the ends of the first external electrodes covered with the second electrodes are spaced apart from the side surfaces of the ceramic electronic component.

Here, the first external electrodes can be formed of a material containing Cu and Si or B as a main component and glass containing at least one member of alkali metals, alkaline earth metals, and transition metals.

The ends of the first external electrodes containing a metal sintered compact are spaced apart from the side surfaces of the ceramic component body. This is because a stress generated when the first external electrodes are sintered acts so that the ends of the first external electrodes are lifted off.

The first external electrodes having such a shape can be obtained by the use of a material containing a conductive powder having a relatively low melting point, such as Cu, and Si or B as a main component and glass containing at least one member of alkali metals, alkaline earth metals, and transition metals.

In such a ceramic electronic component, the length of the first external electrode in contact with the side surface of the ceramic component body is defined as a, the distance from the end surface of the ceramic component body to the end of the first external electrode at the side surface of the ceramic component body is defined as A, the thickness from the side surface of the ceramic component body to the outside surface of the first external electrode is defined as b, and the thickness from the side surface of the ceramic component body to the outside surface of the second external electrode is defined as B. In this case, it is preferable that the a/A ratio be about 10% to about 90% and the b/B ratio be about 10% to about 90%, for example.

When the a/A ratio is lower than about 10% and the b/B ratio is lower than about 10%, the first external electrode is hardly formed at the side surface of the ceramic component body, and thus the side surface of the ceramic component body is hardly wrapped. In this case, since the adhesion between the conductive resin forming the second external electrode and the ceramic component body is weak, the conductive resin may peel off during processing.

When the a/A ratio is lower than about 10%, the second external electrode enters between the end of the first external electrode and the side surface of the ceramic component body. Thus, a possibility decreases which the second external electrode peels off. However, since the proportion of the first external electrode in contact with the side surface of the ceramic component body is low, moisture may come from the corner of the ceramic component body.

When the a/A ratio exceeds about 90%, the distance from the side surface of the ceramic component body at the end of the first external electrode is small. Thus, a stress caused by metal sintering shrinkage may be applied to the ceramic component body without being substantially absorbed.

When the b/B ratio exceeds about 90%, the thickness of the second external electrode covering the first external electrode is small at the side surface of the ceramic component body. Thus, a stress applied to the first external electrode due to bending of the wiring board to which the ceramic electronic component is attached may not be reduced by the second external electrode.

In contrast, when the a/A ratio is in the range of about 10% to about 90% and the b/B ratio is in the range of from about 10% to about 90%, the stress caused by the metal sintering shrinkage is absorbed at the end of the first external electrode apart from the ceramic component body and the stress caused by the bending of the wiring board to which the ceramic electronic component is attached is reduced by the second external electrode.

According to preferred embodiments of the present invention, a method for manufacturing a ceramic electronic component includes: preparing a ceramic component body having ceramic layers and internal electrode layers, in which the internal electrodes are led to two end surfaces; preparing a conductive paste containing conductive metal powder, glass frit having a softening point higher than a sintering starting temperature of the conductive metal powder, and an organic vehicle; immersing the two end surfaces of the ceramic component body in the conductive paste to supply the conductive paste to the two end surfaces and a portion of the side surfaces extending therefrom of the ceramic component body; forming a first external electrode by heating at a temperature higher than the sintering starting temperature of the conductive metal powder and lower than the softening point of the glass frit to proceed sintering of the metal powder in a state where the end thereof is spaced apart from the side surface of the ceramic component body, and then printing at a temperature higher than the softening point of the glass frit; and forming a second external electrode by supplying a conductive resin paste so as to cover at least the first external electrode at the side surface of the ceramic component body.

In the method for manufacturing an electronic component, it is preferable that the conductive metal powder be Cu containing P.

By immersing the end surfaces of the ceramic component body in the conductive paste containing conductive metal powder, glass frit having a softening point higher than the sintering starting temperature of the conductive metal powder, and an organic vehicle, and heating at a temperature higher than the sintering starting temperature of the conductive metal powder and lower than the softening point of the glass frit, sintering of the conductive metal powder starts in a state where the glass frit is not softened. In such a case, since the glass frit is not softened to flow, the sintering of the metal powder progresses in a state where the ceramic and the first external electrode interface is not adhered to each other with glass, and then the first external electrode is formed by the stress caused by sintering shrinkage in such a manner that the end thereof is lifted off the side surface of the ceramic component body. Thereafter, printing is performed at a temperature higher than the softening point of the glass frit. Thus, the glass frit is softened to flow to form a metal sintered compact, i.e., the first external electrode, in a state where the ceramic component body and the first external electrode are brought into close contact with each other.

Here, when P is blended in Cu powder, the sintering starting temperature can be reduced. When the content of P is adjusted, the sintering starting temperature can be adjusted.

According to preferred embodiments of the present invention, the stress caused by the sintering shrinkage of the first external electrode that is formed by sintering metal powder is hardly applied to the ceramic component body. Since the second external electrode containing a conductive resin is formed on the first external electrode, a stress transmitted from the wiring board to which the ceramic electronic component is attached is reduced by the second external electrode. Therefore, even when the wiring board to which the ceramic electronic component is attached bends, cracks are difficult to develop at the end of the first external electrode in the ceramic component body. Therefore, changes in the properties of the ceramic electronic component due to the bending of the wiring board can be prevented.

Moreover, according to the method according to preferred embodiments of the present invention, a ceramic electronic component that is hardly influenced by the stress generated when the external electrode containing a metal sintered compact is formed at the end surface of the ceramic component body can be produced.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
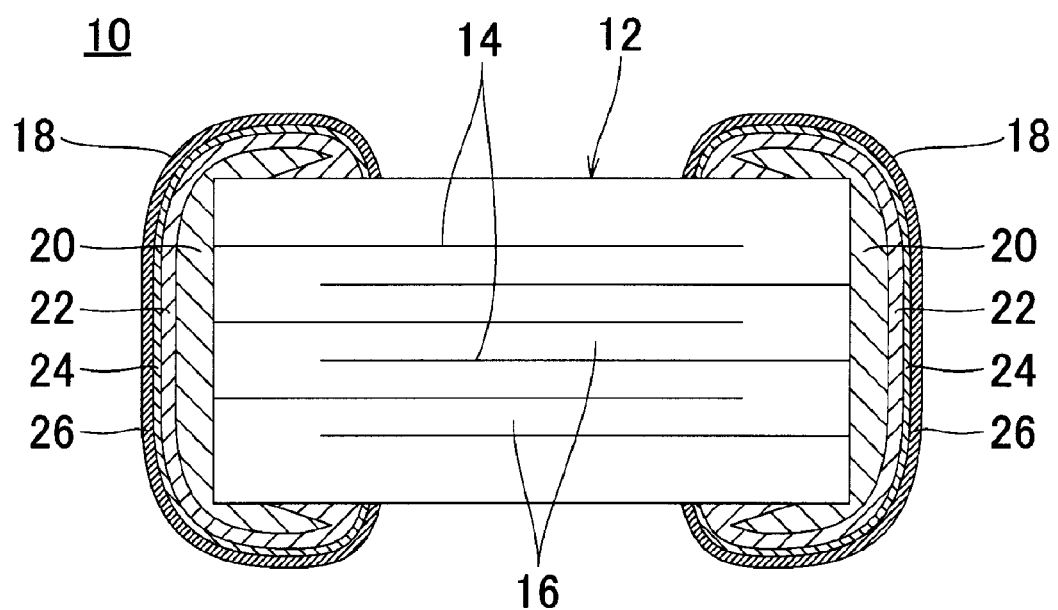
FIG. 1 is a diagram illustrating an example of the internal structure of a laminated ceramic capacitor as a ceramic electronic component according to a preferred embodiment of the present invention.

FIG. 1 is a diagram illustrating the internal structure of a laminated ceramic capacitor as an example of a ceramic electronic component according to preferred embodiments of the present invention. A laminated ceramic capacitor 10 contains a ceramic component body 12 having facing end surfaces and side surfaces connecting the end surfaces. The ceramic component body preferably includes layers of a plurality of internal electrodes 14 and ceramic layers 16. The plurality of internal electrodes 14 are overlapped with each other while facing with each other inside the ceramic component body 12 and are alternately led to the facing end surfaces.

The ceramic component body 12 is formed by firing a chip obtained by forming an internal electrode pattern with a conductive paste on a ceramic green sheet formed with a dielectric ceramic material, laminating a plurality of ceramic green sheets, and cutting the laminate into the shape of each ceramic component body 12.

Figure 2:
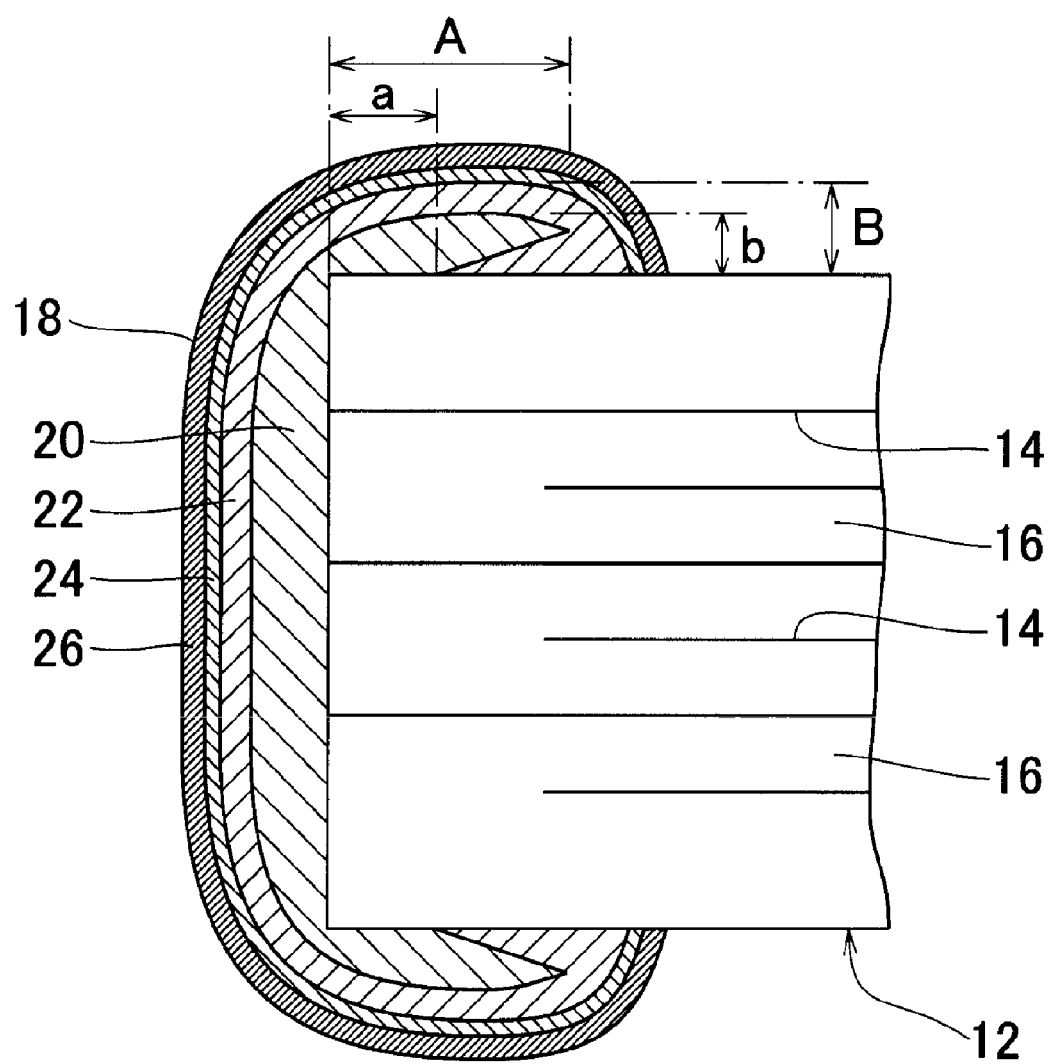
FIG. 2 is an enlarged diagram illustrating one end of the laminated ceramic capacitor illustrated in FIG. 1.

On both the end surfaces of the ceramic component body 12, a terminal electrode 18 is formed. The terminal electrode 18 preferably includes a first external electrode 20 electrically connected to the internal electrodes 14. As shown in FIG. 2, the first external electrode 20 is arranged so as to wrap around from the end surface of the ceramic component body 12 to a portion of the side surface. The first external electrode 20 is arranged so that the end thereof is spaced apart from the side surface of the ceramic component body 12.

In order to form the first external electrode 20, a conductive paste containing conductive metal powder, glass frit, and an organic vehicle is prepared. Here, the conductive metal powder and the glass frit are selected so that the softening point of the glass frit is higher than the sintering starting temperature of the conductive metal powder. As the conductive metal powder, metal powder having a sintering starting temperature of about 500° C. is used, for example. As the glass frit, glass frit having a softening point of about 600° C. is used, for example. By immersing the end surface of the ceramic component body 12 in the conductive paste, the conductive paste adheres so as to wrap around from the end surface of the ceramic component body 12 to a portion of the side surface.

The first electrode 20 is formed by heating the ceramic component body 12 to which the conductive paste has been supplied. Here, when a usual conductive paste is used, a metal sintered compact formed by sintering of metal powder due to the action of glass frit that is softened to flow is formed in close contact with the ceramic component body 12 to reach the top thereof. This is because the softening point of the glass frit is lower than the sintering starting temperature of the metal powder.

In contrast, when about 5% to about 15 mass % of glass frit is added to metal powder having a sintering starting temperature lower than the softening point of the glass frit, sintering of the metal powder starts in a state where the glass frit is not softened to flow by heating at a temperature higher than the sintering starting temperature of the metal powder and lower than the softening point of the glass frit. Therefore, the action of the softened glass frit is not obtained, and the first external electrode 20 is formed so that the end thereof is lifted off the side surface of the ceramic component body 12 at the time of the sintering shrinkage of the metal powder. Thereafter, heat treatment is performed at a temperature higher than the softening point of the glass frit, the grass frit is melted to flow, whereby the first external electrode 20 is formed in close contact with the ceramic component body 12.

Thus, the first external electrode is formed so that the end thereof is lifted off at the time of the sintering shrinkage of the metal powder. Therefore, a stress generated at the time of the formation of the first external electrode 20 is hardly applied to the ceramic component body 12. Here, the lifting length from the end of the first external electrode 20 is adjusted by the degree (high or low) of the softening point of the glass frit. When the softening point of the glass frit is low, the softening of the glass frit is accelerated and a sintered metal is brought into close contact with the ceramic component body. Thus, the lifting degree in the longitudinal direction becomes low. On the contrary, when the softening point of the glass frit is high, the softening of the glass frit is suppressed. Thus, the lifting degree in the longitudinal direction at the end of the sintered metal becomes high.

The lifting height of the end of the first external electrode 20 is adjusted by the difference between the sintering starting temperature of the metal powder and the softening point of the glass frit and the content of the glass frit. When the difference between the sintering starting temperature of the metal powder and the softening point of the glass frit is larger, the sintering of the metal powder progresses. Thus, the lifting in the height direction is likely to occur.

As a metal paste used for such a conductive paste, Cu powder obtained by, for example, atomizing is used. In order to adjust the sintering starting temperature of the metal powder, the sintering starting temperature can be reduced by reducing the particle diameter of Cu powder or blending Cu powder in P. In order to adjust the softening point of the glass frit, alkali metals, alkaline earth metals, transition metals, etc., are possibly added to B or Si as a network forming element. As such glass frit, B—Si—Zn system glass frit or the like can be used.

On the first external electrode 20, a second external electrode 22 containing a conductive resin is formed. The second external electrode 22 is formed by, for example, immersing the end surface of the ceramic component body 12 in a conductive resin containing an Ag filler, a thermosetting resin, such as an epoxy resin, and a solvent to supply the thermosetting resin to the first external electrode 20, and then thermally curing the same. The second external electrode 22 is formed entirely covering the first external electrode 20 and covering a portion of the side surface of the ceramic component body 12.

On the second external electrode 22, a first plating film 24 is formed with, for example, Ni. On the first plating film 24, a second plating film 26 is further formed with, for example, Sn.

Figure 9:
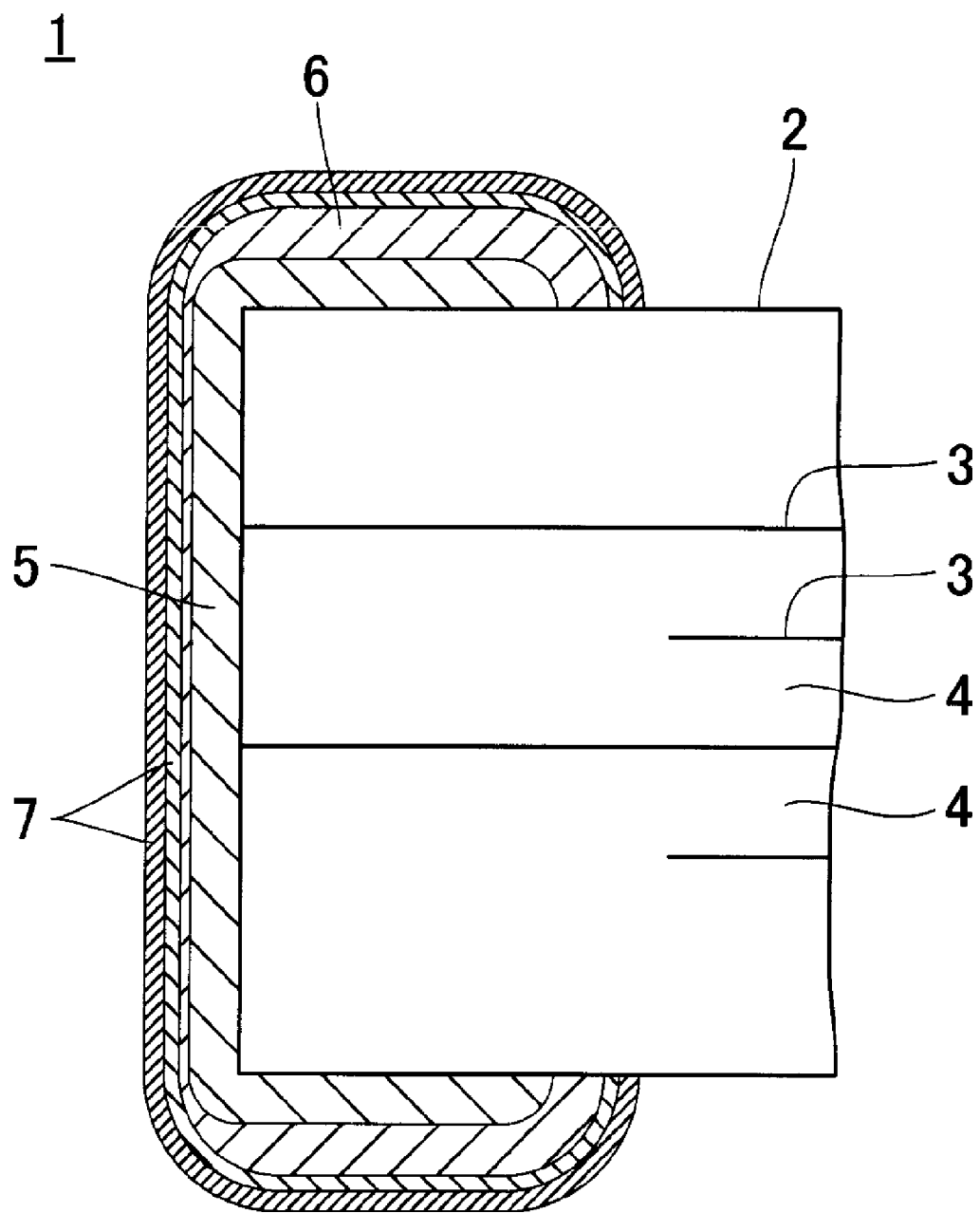
FIG. 9 is diagram illustrating an example of a former ceramic electronic component.

The laminated ceramic capacitor 10 is soldered to, for example, a wiring board for use. Here, when the wiring board bends, a stress is applied to the laminated ceramic capacitor 10. In the case of a conventional ceramic electronic component 1 as shown in FIG. 9, the stress caused by the sintering shrinkage of the metal powder is concentrated on the end of the first external electrode (metal layer 5) at the time of the formation of the first external electrode (metal layer 5). Therefore, when the wiring board bends, and the stress caused by the bending is transmitted to the ceramic electronic component 1, cracks are likely to develop at the end of the first external electrode (metal layer 5) in the ceramic component body 2.

In contrast, in the laminated ceramic capacitor 10, the end of the first external electrode 20 is lifted off due to the stress caused by the sintering shrinkage of the metal powder at the time of the formation of the first external electrode 20 to be spaced apart from the side surface of the ceramic component body 12. Therefore, the stress caused by the sintering shrinkage of the metal powder is hardly applied to the ceramic component body 12. Even when the stress caused by the bending of the wiring board is applied, cracks are difficult to develop in the ceramic component body 12.

The first external electrode 20 is covered with the second external electrode 22 containing a conductive resin. Thus, the stress caused by bending of the wiring board is reduced by the second external electrode 22, whereby the stress applied to the ceramic component body 12 decreases. Therefore, cracks are more difficult to develop in the ceramic component body 12.

Here, as shown in FIG. 2, the length of the first external electrode 20 in contact with the side surface of the ceramic component body 12 is defined as a, the distance from the end surface of the ceramic component body 12 to the end of the first external electrode 20 at the side surface of the ceramic component body 12 is defined as A, the thickness from the side surface of the ceramic component body 12 to the outside surface of first external electrode 20 is defined as b, and the thickness from the side surface of the ceramic component body 12 to the outside surface of the second external electrode 22 is defined as B. In this case, it is preferable that the a/A ratio be about 10% to about 90% and the b/B ratio be about 10% to about 90%, for example.

When the a/A ratio is lower than about 10% and the b/B ratio is lower than about 10%, the first external electrode 20 is hardly formed at the side surface of the ceramic component body 12, and thus the side surface of the ceramic component body 12 is hardly wrapped. In this case, since the adhesion between the conductive resin forming the second external electrode 22 and the ceramic component body 12 is weak, the conductive resin may peel off during processing.

When the a/A ratio is lower than about 10%, the second external electrode 22 enters between the end of the first external electrode 20 and the side surface of the ceramic component body 12. Thus, a possibility that the second external electrode 22 peels off decreases. However, since the proportion of the first external electrode 20 in contact with the side surface of the ceramic component body 12 is low, moisture may come from the corner of the ceramic component body 12.

When the a/A ratio exceeds about 90%, the distance from the side surface of the ceramic component body 12 at the end of the first external electrode 20 is small. Thus, a stress caused by metal sintering shrinkage may be applied to the ceramic component body 12 without being substantially absorbed.

When the b/B ratio exceeds about 90%, the thickness of the second external electrode 22 covering the first external electrode 20 is small at the side surface of the ceramic component body 12. Thus, a stress applied to the first external electrode 20 due to bending of the wiring board to which the ceramic capacitor 10 is attached may not be reduced by the second external electrode 22.

In contrast, when the a/A ratio is in the range of about 10% to about 90% and the b/B ratio is in the range of from about 10% to about 90%, the stress caused by the metal sintering shrinkage is absorbed at the end of the first external electrode 20 apart from the ceramic component body 12 and the stress caused by the bending of the wiring board to which the ceramic capacitor 10 is attached is reduced by the second external electrode 22.

Here, the description is provided with respect to the laminated ceramic capacitor 10, for example. However, the present invention can be applied to a ceramic electronic component having the ceramic component body 12 and the terminal electrode 18 formed at the end surface of the ceramic component body 12 and can be applied to, for example, a chip resistor or a chip inductor.

EXAMPLE 1

In order to manufacture a laminated ceramic capacitor, an about 1.0 mm×0.5 mm×0.5 mm fired ceramic chip and an about 3.2 mm×2.5 mm×2.5 mm fired ceramic chip were prepared as the ceramic component body 12. In the ceramic chip, internal electrode layers and ceramic layers were alternately laminated, and each of the internal electrodes is led to the facing end surface. On the ceramic chip, a metal electrode as the first external electrode 20 was formed. For the formation thereof, a conductive paste, in which Cu powder, glass frit, acryl, varnish, and a solvent were mixed and dispersed with a three-roll mill, was prepared. The end surface of the ceramic chip was immersed in the conductive paste, and fired to form a metal electrode. The firing was performed using a temperature profile in which the ceramic chip to which the conductive paste was applied was held at the maximum temperature of about 870° C. for about 5 minutes in a belt furnace.

For samples in which the end of the metal electrode are lifted off the side surface of the ceramic chip, Cu powder having a sintering starting temperature lower than the softening point of the glass frit was used as the Cu powder used for the conductive paste. Then, heat treatment was performed at a temperature equal to or higher than the sintering starting temperature of the Cu powder and lower than the softening point of the glass frit, and then the metal electrode was formed using the temperature profile of holding at the maximum temperature of about 870° C. for about 5 minutes.

On the metal electrode, a resin electrode as a second external electrode 22 was further formed. For the formation thereof, a conductive resin paste, in which an Ag filler, an epoxy resin, and a solvent were mixed and dispersed with a three roll mill, was prepared. The end surface of the ceramic chip on which the metal electrode was formed was immersed in the conductive resin paste, so that the conductive resin paste was applied in such a manner as to entirely cover the metal electrode. The ceramic chip to which the conductive resin paste was applied was heated in an about 200° C. oven for about 2 hours to cure the resin to form the resin electrode. On the resin electrode, an Ni plating layer and Sn plating layer were formed in the stated order, thereby manufacturing a laminated ceramic capacitor.

The obtained laminated ceramic capacitor was attached to a glass epoxy testing board. For the attachment thereof, a lead free solder paste was printed to the testing board, and the laminated ceramic capacitor was disposed thereon. The testing board on which the laminated ceramic capacitor was disposed was made to pass through a reflow furnace having a maximum temperature of about 240° C. for mounting the laminated ceramic capacitor on the testing board.

Figure 3:
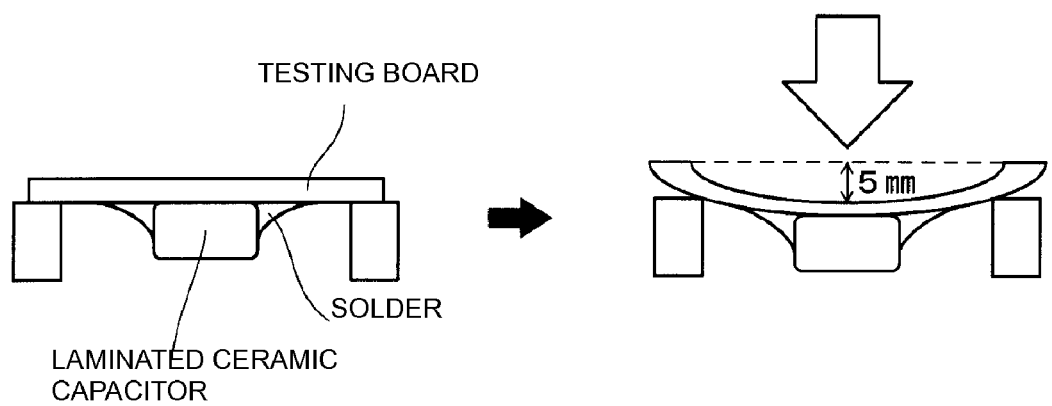
FIG. 3 is a diagram illustrating a test method in Examples.

Next, as shown in FIG. 3, the testing board was disposed on a measuring machine so that the laminated ceramic capacitor faced down. Here, both the ends of the testing board were supported, and then the center thereof was pressed for bending the portion at which the laminated ceramic capacitor was mounted by about 5 mm relative to the testing board upper portion. Then, the state was held for about 5 seconds as it was.

The electrostatic capacities were compared before and after bending the testing board. Then, the testing board in which the capacity decreased by about 10% or more was judged to be poor. The resin electrode was checked for omission. Then, the resin electrode having omission was judged to be poor. A moisture resistance test in which the resin electrode was allowed to stand for about 1000 hours in a wet atmosphere in which the temperature was about 70° C. and the humidity was about 95%. Then, the resin electrode that suffered from deterioration of insulation resistance was judged to be poor.

The tests were performed while varying the a/A value and the b/B value, with respect to the a, A, b, and B indicated in FIG. 2. The results were shown in Table 1. In Table 1, ⊚ indicates that the defective degree is lower than about 1%, ○ indicates that the defective degree is about 1% or more and lower than about 10%, △ indicates that the defective degree is about 10% or more and lower than about 20%, and x indicates that the defective degree is about 20% or more. The samples marked with * in Table 1 are outside the scope of the present invention.

TABLE 1

| Sample No. | a/A (%) | b/B (%) | Reduction in electrostatic capacity | Omission of resin electrode | Moisture resistance test |
|---|---|---|---|---|---|
| 1* | a = A = O | | ⊚ | X | X |
| 2 | 0 | 5 | ⊚ | ○ | △ |
| 3 | 0 | 10 | ⊚ | ⊚ | △ |
| 4 | 0 | 30 | ⊚ | ⊚ | △ |
| 5 | 0 | 50 | ⊚ | ⊚ | △ |
| 6 | 0 | 70 | ⊚ | ⊚ | △ |
| 7 | 0 | 90 | ⊚ | ⊚ | △ |
| 8 | 0 | 95 | ○ | ⊚ | △ |
| 9* | 0 | 100 | X | ⊚ | △ |
| 10 | 5 | 5 | ⊚ | ○ | ○ |
| 11 | 5 | 10 | ⊚ | ⊚ | ○ |
| 12 | 5 | 30 | ⊚ | ⊚ | ○ |
| 13 | 5 | 70 | ⊚ | ⊚ | ○ |
| 14 | 5 | 90 | ⊚ | ⊚ | ○ |
| 15 | 5 | 95 | ○ | ⊚ | ○ |
| 16* | 5 | 100 | X | ⊚ | ○ |
| 17 | 10 | 5 | ⊚ | ○ | ⊚ |
| 18 | 10 | 10 | ⊚ | ⊚ | ⊚ |
| 19 | 10 | 30 | ⊚ | ⊚ | ⊚ |
| 20 | 10 | 50 | ⊚ | ⊚ | ⊚ |
| 21 | 10 | 70 | ⊚ | ⊚ | ⊚ |
| 22 | 10 | 90 | ⊚ | ⊚ | ⊚ |
| 23 | 10 | 95 | ○ | ⊚ | ⊚ |
| 24* | 10 | 100 | X | ⊚ | ⊚ |
| 25 | 30 | 50 | ⊚ | ⊚ | ⊚ |
| 26 | 50 | 50 | ⊚ | ⊚ | ⊚ |
| 27 | 70 | 50 | ⊚ | ⊚ | ⊚ |
| 28 | 50 | 30 | ⊚ | ⊚ | ⊚ |
| 29 | 50 | 70 | ⊚ | ⊚ | ⊚ |
| 30 | 50 | 90 | ⊚ | ⊚ | ⊚ |
| 31 | 90 | 5 | ⊚ | ○ | ⊚ |
| 32 | 90 | 10 | ⊚ | ⊚ | ⊚ |
| 33 | 90 | 30 | ⊚ | ⊚ | ⊚ |
| 34 | 95 | 5 | ○ | ○ | ⊚ |
| 35 | 95 | 10 | ○ | ⊚ | ⊚ |
| 36 | 95 | 30 | ○ | ⊚ | ⊚ |
| 37* | 100 | 5 | X | △ | ⊚ |

Figure 4:
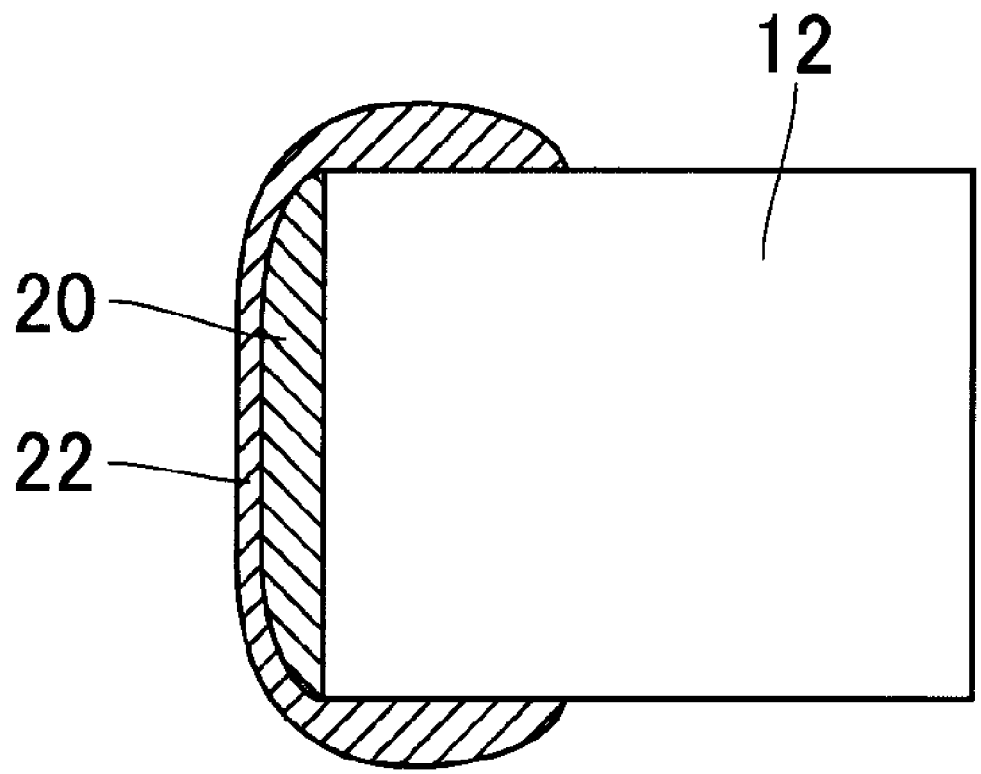
FIG. 4 is a diagram illustrating an example of the end of laminated ceramic capacitors in Examples.

In Table 1, a sample No. 1 is not wrapped with the metal electrode as shown in FIG. 4. In such a laminated ceramic capacitor, the stress generated at the time of the formation of the metal electrode is not concentrated on the side surface of the ceramic chip. Thus, cracks do not develop in the ceramic chip and the defective degree of reduction in electrostatic capacity is lower than about 1%. However, since the adhesion between the resin electrode and the ceramic chip was weak, a large number of resin electrode omissions occurred. Since the metal electrode was not formed at the corner of the ceramic chip, moisture came from the portion. Then, reduction in insulation resistance was observed in the moisture resistance test.

Figure 5:
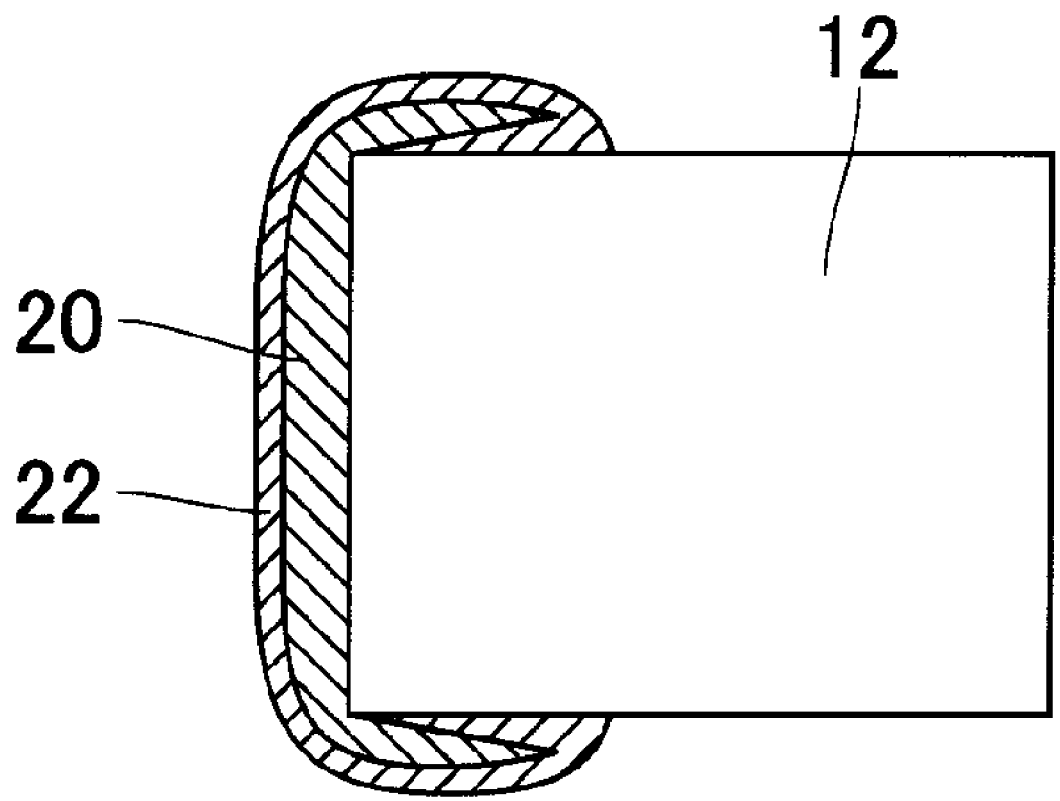
FIG. 5 is a diagram illustrating another example of the end of the laminated ceramic capacitors in Examples.
Figure 6:
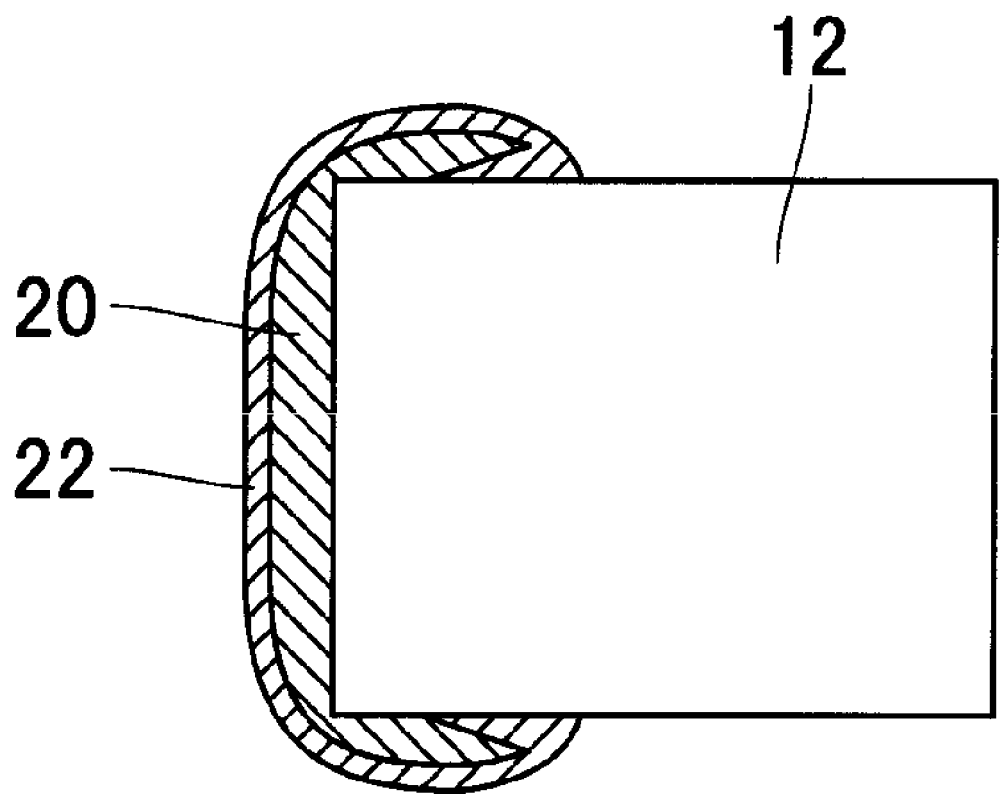
FIG. 6 is a diagram illustrating a still another example of the end of the laminated ceramic capacitors in Examples.

In samples Nos. 2 to 9, the metal electrode is thoroughly lifted off the side surface from the corner of the ceramic chip as shown in FIG. 5. In samples Nos. 10 to 36, the metal electrode is lifted off the side surface of the ceramic chip by a given length from the end thereof as shown in FIG. 6. In the laminated ceramic capacitors, the stress caused by the sintering shrinkage of the metal powder at the time of the formation of the metal electrode is hardly concentrated. Thus, cracks are difficult to develop in the ceramic chips and the defective degree of electrostatic capacity is low.

Figure 7:
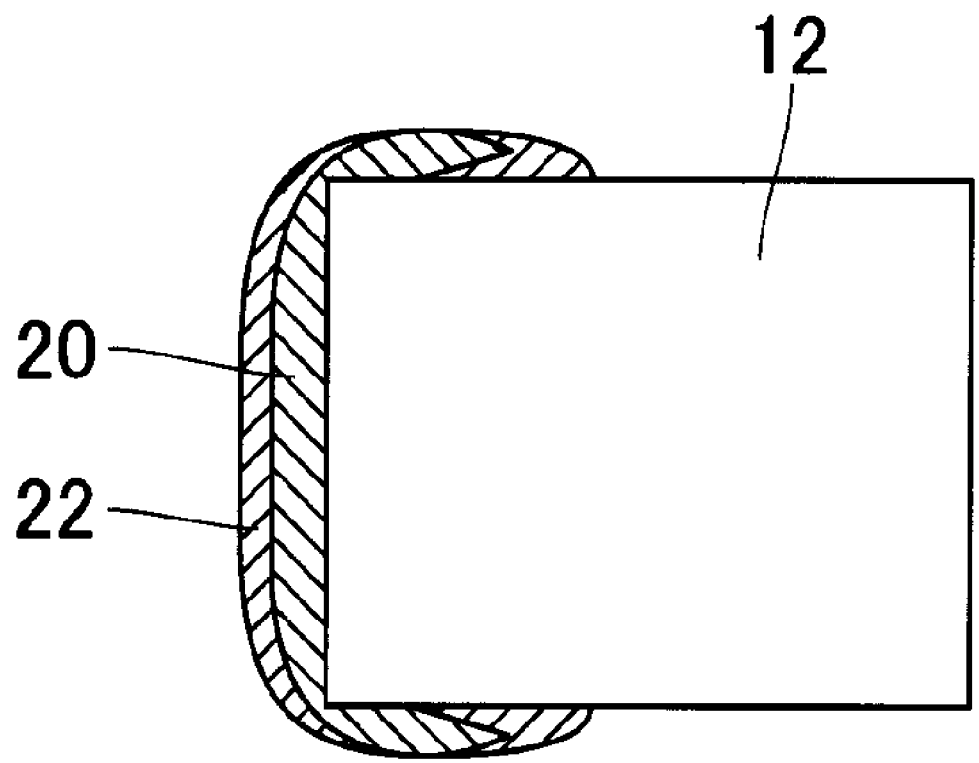
FIG. 7 is a diagram illustrating another example of the end of the laminated ceramic capacitors in Examples.

In samples Nos. 9, 16, and 24, the b/B ratio is 100%, and, as shown in FIG. 7, the maximum thickness of the lifted metal electrode is the same as the thickness of the resin electrode therearound at the side surface of the ceramic chip, and the most lifted portion of the metal electrode is exposed. In such a laminated ceramic capacitor, the stress caused by bending of the testing board is not reduced by the resin electrode, the stress is concentrated on the end of the metal electrode to develop cracks in the ceramic chip, and the defective degree of reduction in electrostatic capacity increases. In the case of laminated ceramic capacitors of samples Nos. 8, 15, and 23 having a b/B ratio of about 95%, i.e., in the case where the thickness of the resin electrode on the metal electrode is small, the defective degree of electrostatic capacity slightly increased. When the a/A ratio is about 95% as in samples Nos. 34 to 36, the lifting length of the metal electrode is small. Therefore, the stress caused by the sintering shrinkage of the metal powder remained and the defective degree of electrostatic capacity slight increased.

In the laminated ceramic capacitors having a structure such that the end of the metal electrode is lifted off as in the samples Nos. 2 to 36, the resin electrode entered between the lifted metal electrode and the ceramic chip, and the defective degree of resin electrode omission was low. When the b/B ratio is about 5% as in the samples Nos. 2, 10, 17, 31, and 34, the thickness of the metal electrode is small. Therefore, the amount of the resin electrode entering between the metal electrode and the ceramic chip was small and the defective degree of resin electrode omission slightly increased.

In the case where the metal electrode is thoroughly lifted off the side surface from the corner of the ceramic chip as in the samples Nos. 2 to 9, the entering of moisture from the corner of the ceramic chip cannot be sufficiently prevented. Thus, the defective degree in the moisture resistance test was slightly high. In the case where the a/A ratio is about 5% as in the samples Nos. 10 to 16, the defective degree in the moisture resistance slight increased, although the corner periphery of the ceramic chip is covered with the metal electrode.

Figure 8:
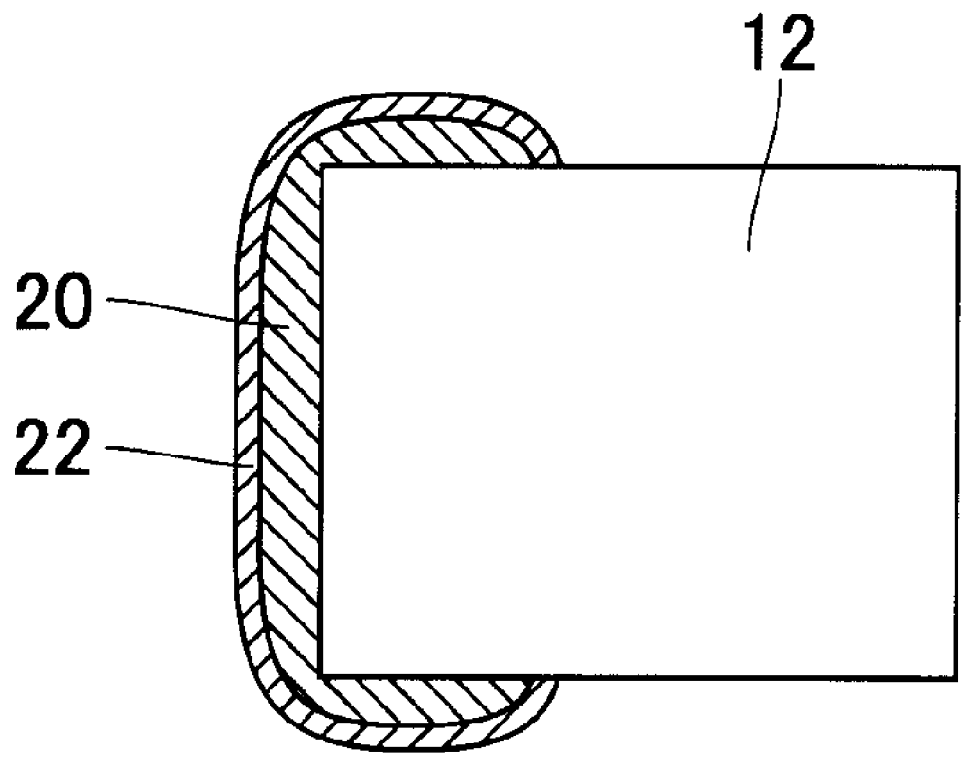
FIG. 8 is a diagram illustrating a still another example of the end of the laminated ceramic capacitors in Examples.

The sample No. 37 is a former laminated ceramic capacitor in which the end of the metal electrode is not lifted off as shown in FIG. 8. The stress generated at the time of the sintering shrinkage of the metal powder was concentrated on the end of the metal electrode, the stress caused by bending of the testing board was applied to develop cracks in the ceramic chip, and the defective degree of reduction in electrostatic capacity increased. Since the resin electrode did not enter between the metal electrode and the ceramic chip, the defective degree of resin electrode omission slightly increased.

As is understood from Examples above, in the case where the end of the metal electrode is spaced apart from the side surface of the ceramic chip and the resin electrode is formed in such a manner as to entirely cover the metal electrode, defects are difficult to occur, even when the board to which the laminated ceramic capacitor is attached bends. It is revealed that outstanding effects are obtained particularly when the a/A ratio is about 10% to about 90% and the b/B ratio is about 10% to about 90%.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A ceramic electronic component, comprising:
a ceramic component body having two end surfaces to which internal electrodes are led and side surfaces connecting the two end surfaces;
first external electrodes containing a metal sintered compact and arranged so as to wrap around from the two end surfaces of the ceramic component body to a portion of the side surfaces to be connected to the internal electrodes; and
second external electrodes containing a conductive resin and arranged so as to entirely cover the first external electrodes at the side surfaces of the ceramic component body; wherein
the end of the first external electrode covered with the second electrode is spaced apart from the side surface of the ceramic electronic component.

2. The ceramic electronic component according to claim 1, wherein the first external electrode includes Cu and Si or B as a main component and glass containing at least one member of alkali metals, alkaline earth metals, and transition metals.

3. The ceramic electronic component according to claim 1, wherein when the length of the first external electrode in contact with the side surface of the ceramic component body is defined as a, the distance from the end surface of the ceramic component body to the end of the first external electrode at the side surface of the ceramic component body is defined as A, the thickness from the side surface of the ceramic component body to the outside surface of the first external electrode is defined as b, and the thickness from the side surface of the ceramic component body to the outside surface of the second external electrode is defined as B, the a/A ratio is about 10% to about 90% and the b/B ratio is about 10% to about 90%.

4. A method for manufacturing a ceramic electronic component, comprising:
preparing a ceramic component body having ceramic layers and internal electrode layers, in which the internal electrodes are led to two end surfaces;
preparing a conductive paste containing conductive metal powder, glass frit having a softening point higher than a sintering starting temperature of the conductive metal powder, and an organic vehicle;
immersing the two end surfaces of the ceramic component body in the conductive paste to supply the conductive paste to the two end surfaces and a portion of the side surface extending therefrom of the ceramic component body;
forming first external electrodes by heating at a temperature higher than the sintering starting temperature of the conductive metal powder and lower than the softening point of the glass frit to proceed sintering of the metal powder in a state where the ends are spaced apart from the side surfaces of the ceramic component body, and then printing at a temperature higher than the softening point of the glass frit; and
forming second external electrodes by supplying a conductive resin paste in such a manner as to cover at least the first external electrodes at the side surfaces of the ceramic component body.

5. The method for manufacturing a ceramic electronic component according to claim 4, wherein the conductive metal powder is Cu containing P.

* * * * *